Oct. 24, 1939.  H. KING  2,176,905
FOOD MOLDING MACHINE
Filed Nov. 27, 1937  6 Sheets-Sheet 3
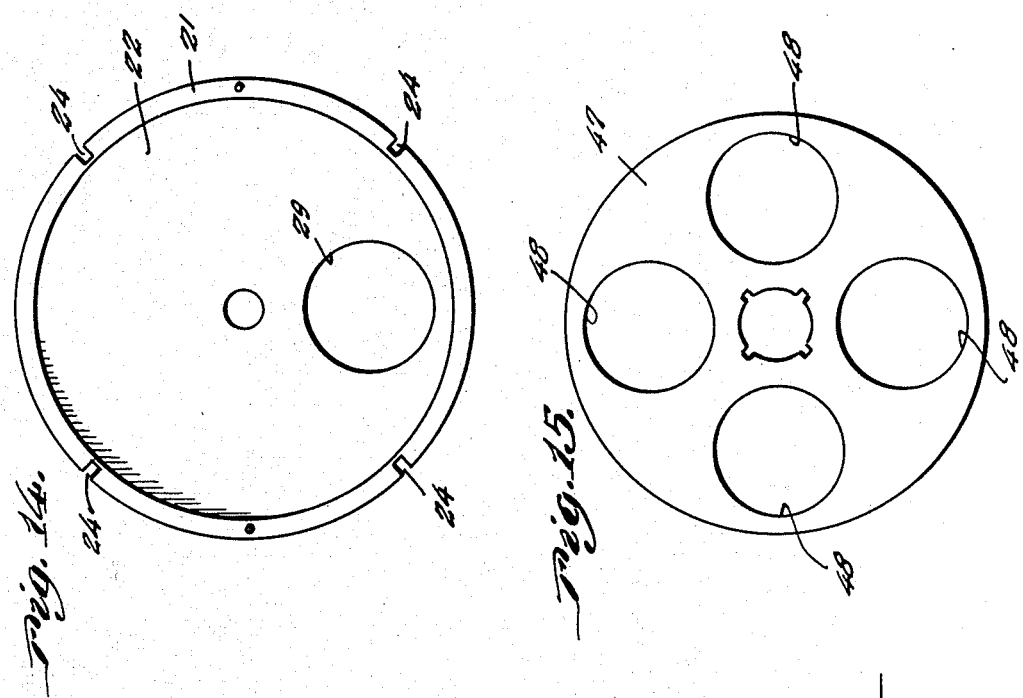
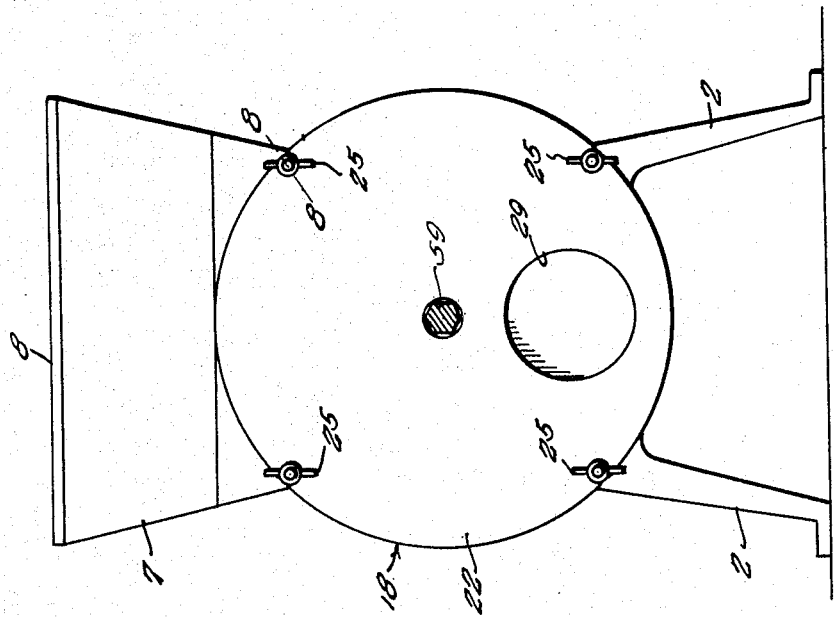
Inventor
Harry King
By Clarence A. O'Brien
Hyman Berman
Attorneys

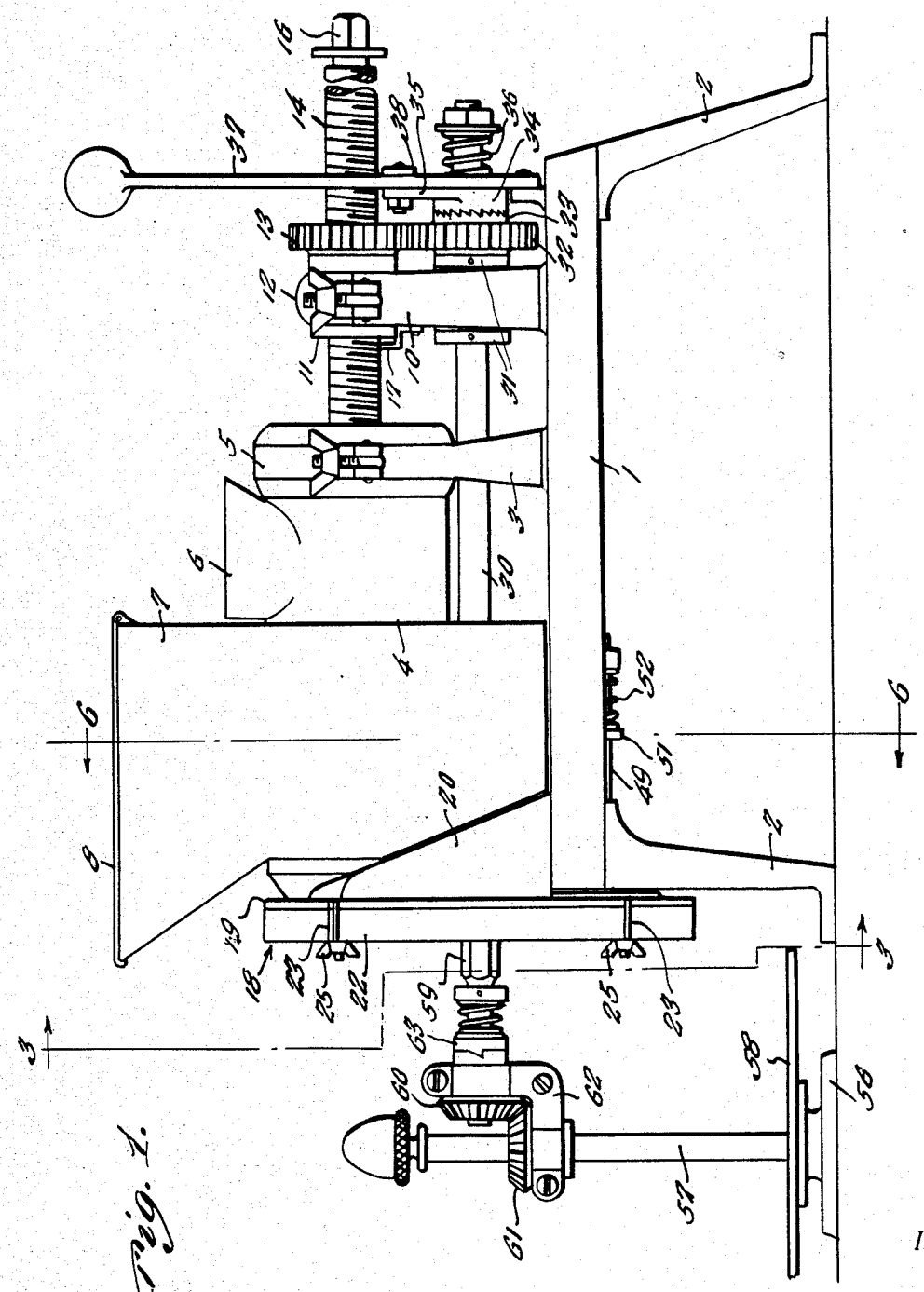

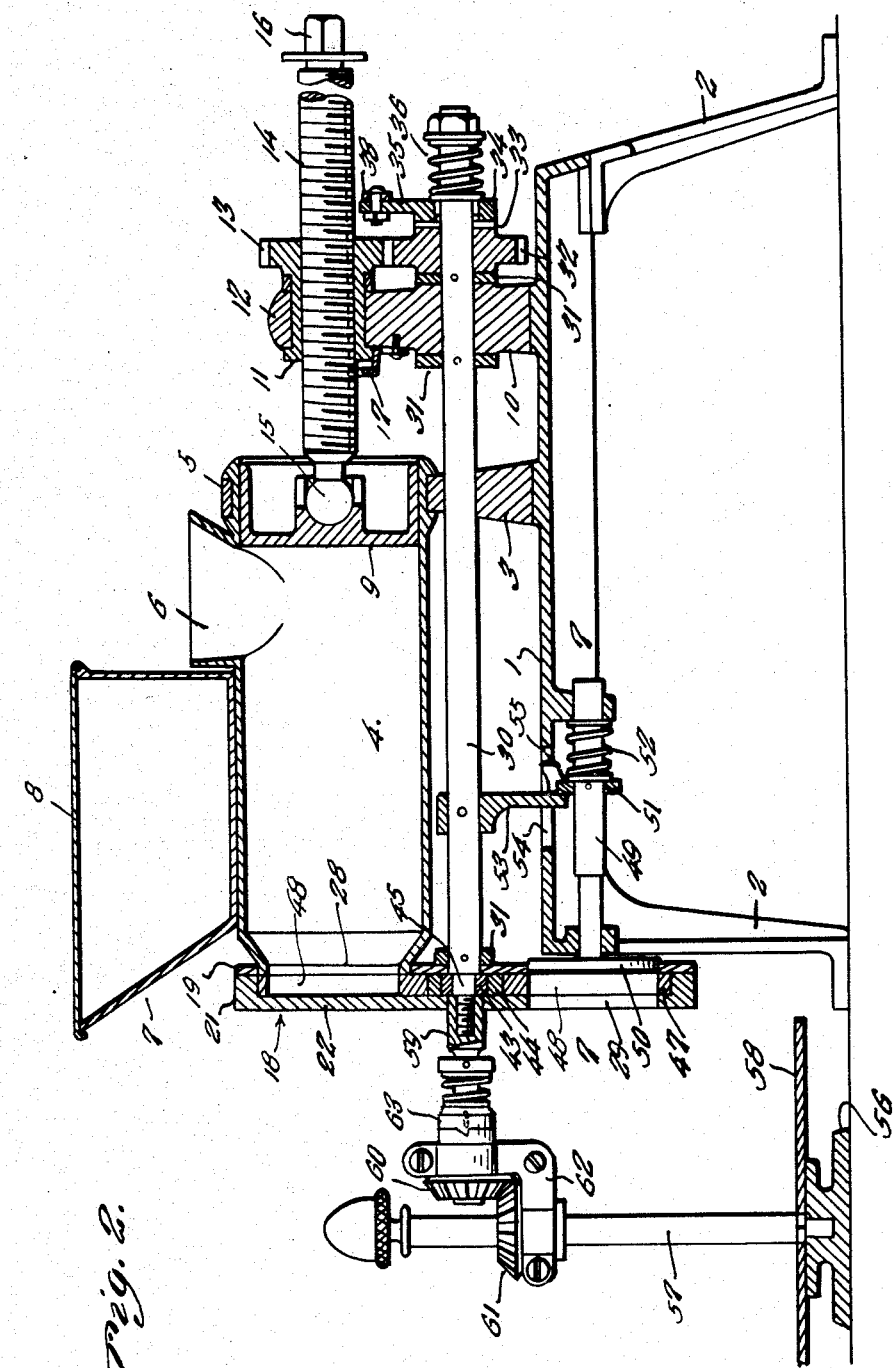

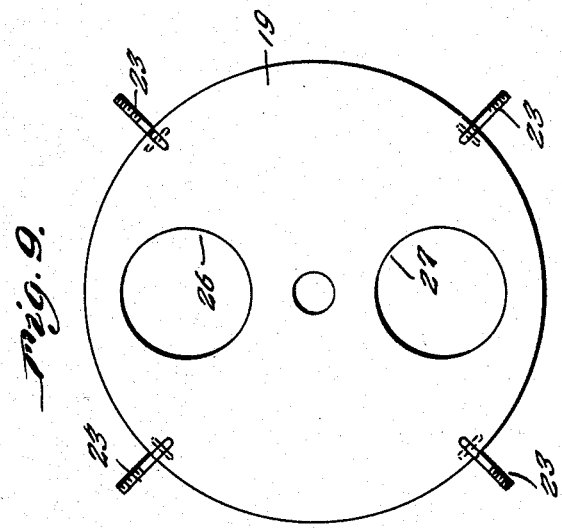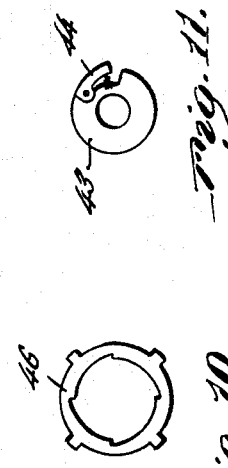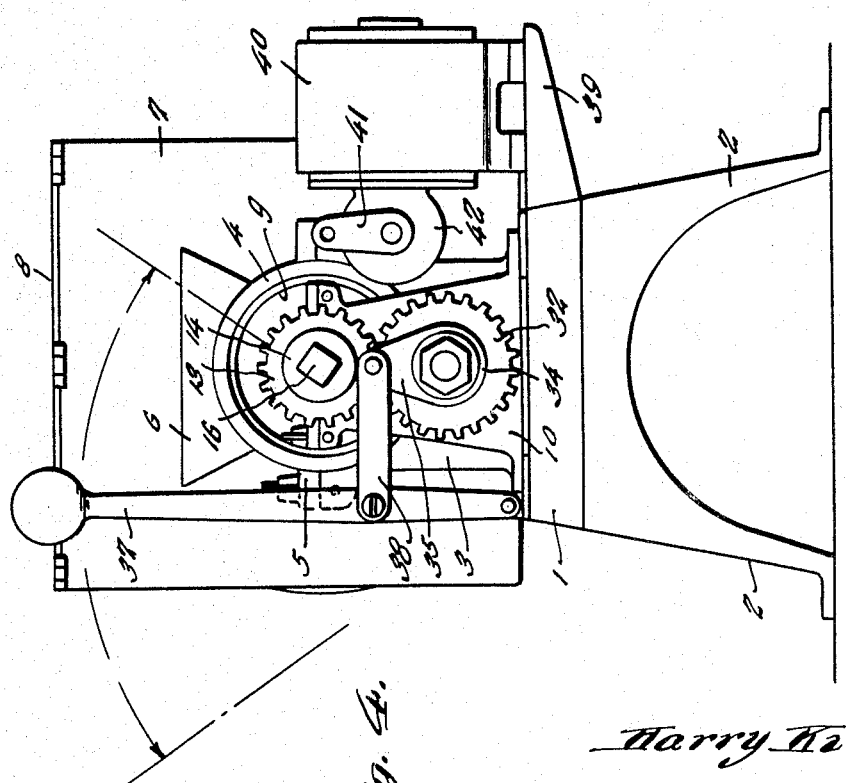

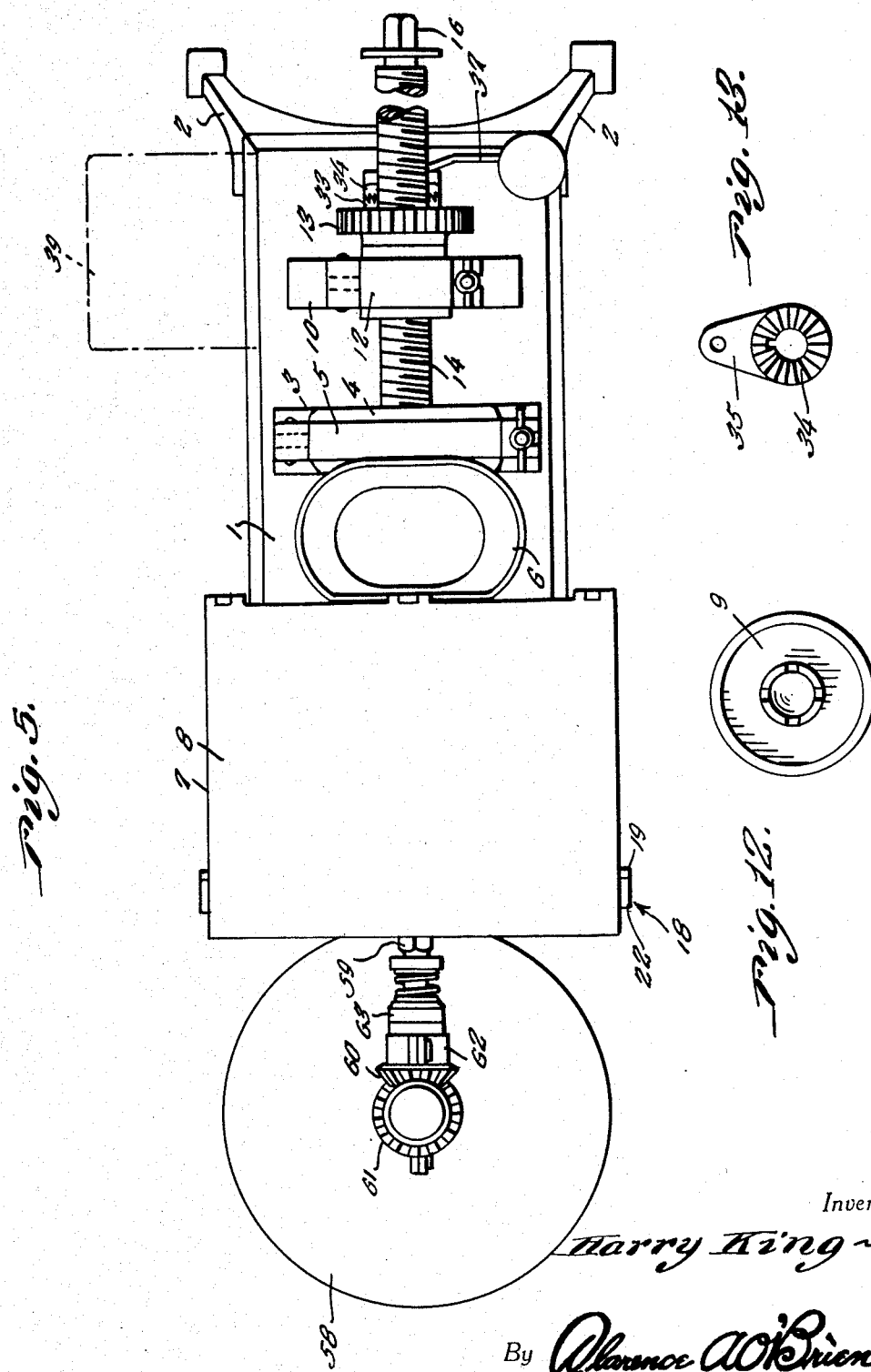

Oct. 24, 1939.  H. KING  2,176,905
FOOD MOLDING MACHINE
Filed Nov. 27, 1937  6 Sheets-Sheet 6
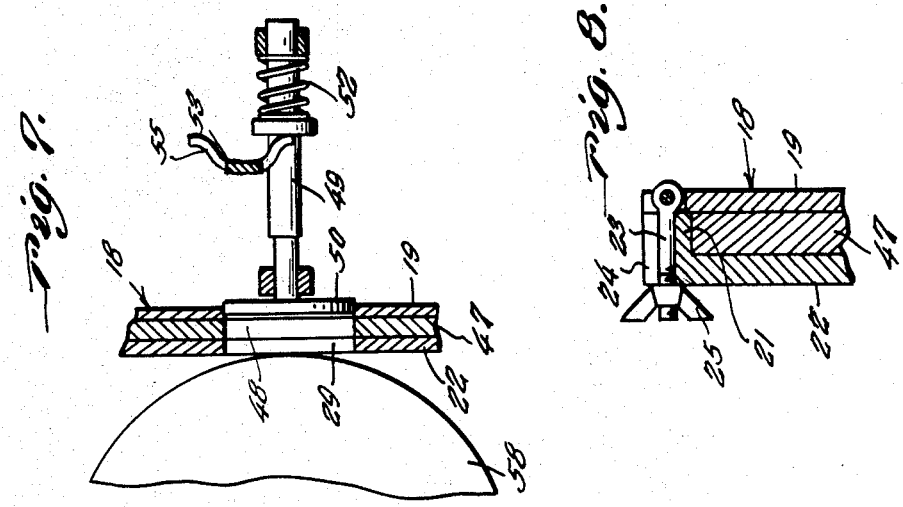
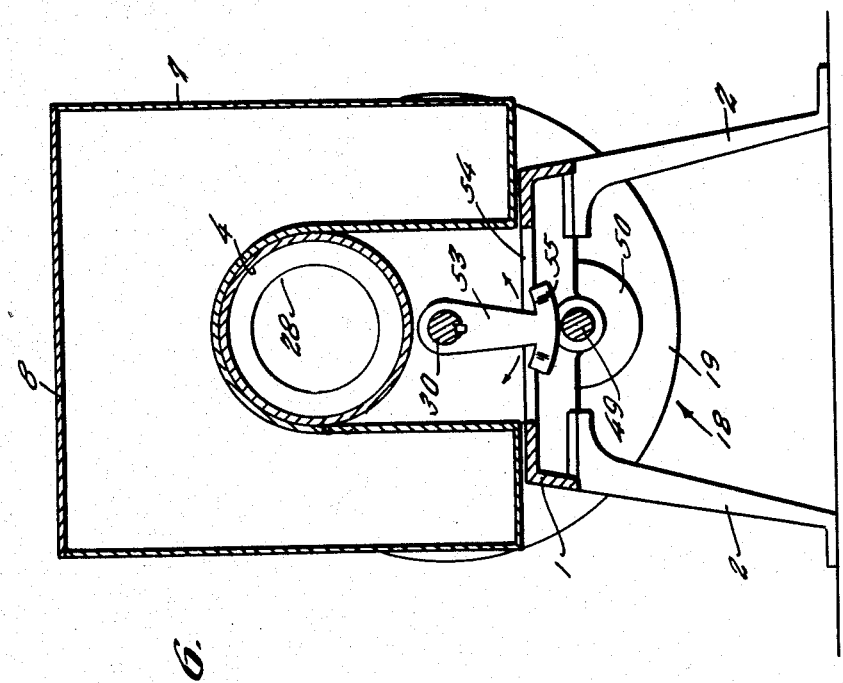
Inventor
Harry King
By Clarence A. O'Brien
Hyman Berman
Attorneys Patented Oct. 24, 1939

2,176,905

UNITED STATES PATENT OFFICE 2,176,905

FOOD MOLDING MACHINE

Harry King, Portsmouth, Ohio

Application November 27, 1937, Serial No. 176,888

2 Claims. (Cl. 107—8)

The present invention relates to new and useful improvements in food molding machines and has for one of its important objects to provide, in a manner as hereinafter set forth, a device of this character embodying a combination and arrangement which is such that ground hamburger steak, sausage, and other foods may be rapidly formed into cakes which will be uniform and attractive in appearance.

Another important object of the invention is to provide a food molding machine of the aforementioned character wherein the means for performing all of the several operations may be actuated from a single source of power.

Still another very important object of the invention is to provide a molding machine of the character described comprising novel means for cooling the food.

Other objects of the invention are to provide a food molding machine of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a food molding machine constructed in accordance with the present invention.

Figure 2 is a view in vertical longitudinal section through the invention.

Figure 3 is a cross sectional view, taken substantially on the line 3—3 of Fig. 1.

Figure 4 is a view in rear elevation of the invention.

Figure 5 is a top plan view.

Figure 6 is a cross sectional view, taken substantially on the line 6—6 of Fig. 1.

Figure 7 is a fragmentary view in horizontal section, taken substantially on the line 7—7 of Fig. 2.

Figure 8 is a sectional view through a portion of the mold, taken substantially on the line 8—8 of Fig. 3.

Figure 9 is a detail view in elevation of the rear mold plate.

Figure 10 is a detail view in elevation of the ratchet ring on which the rotary mold disk is mounted.

Figure 11 is a detail view in elevation of the pawl ring on which the ring shown in Fig. 10 is mounted.

Figure 12 is a detail view in rear elevation of the piston.

Figure 13 is a detail view in elevation of the ratchet constituting a part of the operating mechanism.

Figure 14 is a view in rear elevation of the forward or front mold plate.

Figure 15 is a detail view in elevation of the rotary mold disk.

Referring now to the drawings in detail, it will be seen that the embodiment of the invention which has been illustrated comprises a base 1 of suitable metal having supporting legs 2. Rising from the base 1 at an intermediate point is a standard 3. The reference numeral 4 designates a horizontal cylinder the rear end of which is removably secured on the standard 3 through the medium of a clamp 5 on said standard. Adjacent its rear end, the cylinder 4 is provided with a hopper 6. It will be observed that the cylinder 4 is open at both ends. Straddling the cylinder 4, forwardly of the hopper 6, is a cooling jacket 7 for the reception of ice, said jacket being provided with a hinged cover 8. The reference numeral 9 designates a piston which is operable in the cylinder 4.

Rising from the base 1, rearwardly of the standard 3, is a post 10 having journalled in a bearing provided therefor on its upper end an internally threaded sleeve 11 which is secured by a hinged cap 12. On the rear end of the sleeve 11 is a gear 13. Threadedly mounted in the sleeve 11 is a feed screw 14 which is coupled at its forward end to the piston 9 by a ball and socket connection 15. At its rear end, the feed screw 14 terminates in a polygonal head 16. A finger 17 on the post 10 is slidably engaged in a longitudinal groove in the feed screw 14 for positively securing said feed screw against rotation.

Mounted on the forward end of the base 1 is a mold which is designated generally by the reference numeral 18. The mold 18 comprises a circular back plate 19 having brackets 20 thereon which are secured to the base 1 in any suitable manner, as by welding. Removably mounted on the plate 19 and spaced therefrom by a flange 21 is a circular front plate 22. Threaded shanks 23 are pivotally mounted on the plate 19 and engageable in notches 24 in the periphery of the plate 22 for securing said plates together, wing nuts 25 being threaded on said shanks and engaged with said plate 22.

The plate 19 has formed therein upper and lower circular openings 26 and 27, respectively. The cylinder 4 terminates in a reduced forward end portion 28 which is engaged in the opening 26. The plate 22 has formed in its lower portion a circular opening 29 which is aligned with the opening 27.

Rotatably mounted in the standard 3 and the post 10 and extending longitudinally beneath the cylinder 4 is a shaft 30. Collars 31 secure the shaft 30 against longitudinal movement. Fixed on the shaft 30 rearwardly of the post 10 is a gear 32 which is in mesh with the gear 13. On the hub portion of the gear 32 is a ratchet 33. Splined on the shaft 30 is a ratchet 34 from which an arm 35 extends. A coil spring 36 on the shaft 30 yieldingly engages the ratchet 34 with the ratchet 33 for driving the gear 32 in a step by step manner.

Mounted for swinging movement on the rear end portion of the base 1 is a hand lever 37. A link 38 operatively connects the hand lever 37 to the arm 35 on the ratchet 34. Also mounted on the rear end portion of the base 1 and projecting laterally therefrom is a bracket 39 on which an electric motor 40 is mounted. The motor 40 is adapted to oscillate an arm 41 through the medium of a suitable gear unit 42. If desired, the link 38 may be disconnected from the hand lever 37 and connected to the arm 41 for driving the machine through the medium of the electric motor 40.

The forward end portion of the shaft 30 extends rotatably through the mold 18, as illustrated to advantage in Fig. 2 of the drawings. The mold 18 further includes a ring 43 (see Figs. 2 and 11) having mounted on its periphery a spring pressed pawl 44. The ring 43 is fixed on the reduced portion 45 of the shaft 30. Rotatably mounted on the ring 43 is a ratchet 46 which is adapted to be driven in one direction by the pawl 44 on said ring 43. It will be observed that the teeth of the ratchet 6 are on the inner periphery thereof. Keyed on the ratchet 46 is a mold disk 47. The construction and arrangement is such that the plates 19 and 22 constitute a housing for the mold disk 47. The mold disk 47 has formed therein four circular openings 48 for registry with the openings 26, 27 and 29. The openings 48 constitute chambers in which the food is molded.

Slidably mounted beneath the forward portion of the base 1 is an ejector 49 which includes a head 50 aligned with the openings 27 and 29 and the adjacent chamber 48 in the mold disk 47. A collar 51 is fixed on the ejector 49 at an intermediate point. A coil spring 52 yieldingly urges the ejector 49 forwardly. Fixed on the shaft 30 at an intermediate point and depending therefrom is an arm 53 which is operable in a slot 54 in the base 1. On the lower end of the arm 53 is a cam 55 (see Fig. 7) which is engageable with the collar 51 for retracting the ejector 49 against the tension of the coil spring 52.

Located forwardly of the base 1 is a base 56 having rotatably mounted thereon an upright 57. Fixed on the lower end portion of the upright 57 for rotation therewith is a rotary conveyor 58 in the form of a circular plate. Threadedly mounted on the forward end of the shaft 30 is an extension 59 having loosely mounted thereon a bevelled gear 60. The gear 60 drives a bevelled gear 61 which is fixed on the upright 57. An angular bracket 62 holds the gears 60 and 61 in mesh, said gears being rotatable in said bracket. A spring pressed clutch 63 which is splined on the shaft extension 59 is adapted to drive the gear 60 in one direction.

Briefly, the operation of the machine is substantially as follows:

With the piston 9 in retracted position, as shown in Fig. 2 of the drawings, the food to be molded is placed in the cylinder 4 through the hopper 6. The lever 37 is swung from right to left as seen in Fig. 4 of the drawings for actuating the shaft 30 in one direction. Thus, through the gears 13 and 32 the feed screw 14, etc., the piston 9 is fed forwardly in the cylinder 4 a distance sufficient to force the desired quantity of food into the chamber 48 of the mold disk 18 which is aligned with said cylinder. During this operation the ejector 49 is released to empty a previously filled mold chamber and said ejector is then retracted on the same movement. When the lever 37 is returned or swung from left to right, the mold disk 47, through the medium of the elements 43, 44, 46, etc., is rotated sufficiently to bring an empty chamber 48 into alignment or communication with the cylinder 4 for receiving food therefrom. Through the medium of the one way clutch 63 on the shaft extension 59, the conveyor 58 is rotated in one direction only in a step by step manner by the oscillating shaft 30.

It will thus be seen that a machine has been provided wherein the food may be rapidly molded in a sanitary manner without the necessity of touching it with the hands. Further, the construction and arrangement is such that the machine may be expeditiously taken apart for cleaning or other purposes and reassembled.

It is believed that the many advantages of a food molding machine constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A food molding machine comprising a base, a cylinder for the reception of food mounted on said base, a rotary mold on the base including a plurality of chambers for communication with the cylinder for receiving food therefrom, a piston operable in the cylinder for forcing the food into the chambers, a single ejector slidable on the base and engageable in the chambers for removing the food therefrom, and common means for actuating the mold, the piston and the ejector.

2. A food molding machine comprising a base, an oscillatory shaft mounted on said base, means for oscillating said shaft, a cylinder, for the reception of food, mounted on the base, a piston, for ejecting the food, slidable in said cylinder, means operatively connecting said piston to the shaft for actuation thereby, a rotary mold mounted on the base and having a plurality of chambers for communication with the cylinder for receiving the food therefrom, means operatively connecting said mold to the shaft for actuation thereby, a spring projected ejector slidably mounted on the base and engageable in the chambers of the mold for removing the food therefrom, and means operatively connecting said ejector to the shaft for retraction thereby.

HARRY KING.